US009047302B1

(12) United States Patent
Bandopadhyay (10) Patent No.: US 9,047,302 B1
(45) Date of Patent: Jun. 2, 2015

(54) SYSTEMS AND METHODS FOR DEDUPLICATING FILE DATA IN TIERED FILE SYSTEMS (71) Applicant: Tushar Bandopadhyay, San Jose, CA (US)

(72) Inventor: Tushar Bandopadhyay, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 193 days.

(21) Appl. No.: 13/647,567

(22) Filed: Oct. 9, 2012

(51) Int. Cl.
*G06F 7/00* (2006.01)
*G06F 17/00* (2006.01)
*G06F 17/30* (2006.01)

(52) U.S. Cl.
CPC ................ *G06F 17/30156* (2013.01)

(58) Field of Classification Search
CPC ............. G06F 17/30156; G06F 11/1453
USPC ......................................... 707/692
See application file for complete search history.

(56) References Cited

U.S. PATENT DOCUMENTS

| 7,103,740 | B1 * | 9/2006 | Colgrove et al. | 711/162 |
| 7,567,188 | B1 * | 7/2009 | Anglin et al. | 341/63 |
| 7,822,939 | B1 * | 10/2010 | Veprinsky et al. | 711/170 |
| 8,504,531 | B2 * | 8/2013 | Ambat et al. | 707/692 |
| 2008/0104081 | A1 * | 5/2008 | Mimatsu | 707/10 |
| 2009/0204649 | A1 | 8/2009 | Wong et al. | |
| 2009/0204650 | A1 | 8/2009 | Wong et al. | |
| 2011/0078112 | A1 * | 3/2011 | Takata et al. | 707/622 |
| 2011/0320865 | A1 * | 12/2011 | Jain et al. | 714/6.22 |
| 2012/0095968 | A1 | 4/2012 | Gold | |

OTHER PUBLICATIONS

"Oracle ZFS Storage Appliance", https://www.oracle.com/storage/nas/index.html, as accessed Jul. 17, 2012, (On or before Jul. 17, 2012).
"NetApp", http://www.netapp.com/us/, as accessed Jul. 17, 2012, (Mar. 13, 2008).

* cited by examiner

*Primary Examiner* — Fred I Ehichioya
*Assistant Examiner* — Kris Mackes
(74) *Attorney, Agent, or Firm* — ALG Intellectual Property, LLC (57) ABSTRACT

A computer-implemented method for deduplicating file data in tiered file systems may include identifying a tiered file system that includes a primary storage tier and a deduplicated storage tier. The method may also include detecting at least a portion of file data that has not been accessed in the primary storage tier within a predetermined period of time. The method may further include determining whether the portion of data stored in the primary storage tier is also stored in the deduplicated storage tier. In addition, the method may include ensuring that the deduplicated storage tier is currently storing a unique instance of the portion of file data stored in the primary storage tier and then removing the portion of file data from the primary storage tier. Various other methods, systems, and computer-readable media are also disclosed.

20 Claims, 6 Drawing Sheets

SYSTEMS AND METHODS FOR DEDUPLICATING FILE DATA IN TIERED FILE SYSTEMS

BACKGROUND

In today's world of vast computing technology, technology users may encounter design constraints that effectively force the users to choose between one set of benefits and another. In an effort to maximize the performance of their computing devices, some users may implement computing techniques designed to achieve high-speed access to certain file data. For example, a user may implement a tiered file system that includes a primary storage tier configured to store "hot" data (e.g., frequently accessed file data) and a secondary storage tier configured to store "cold" data (e.g., infrequently accessed file data). In this example, the tiered file system may enable the user's computing device to access the "hot" data stored in the primary storage tier faster than the "cold" data stored in the secondary storage tier. As such, by storing the "hot" data in the primary storage tier, the tiered file system may ensure that the user's computing device has high-speed access to the "hot" data.

Likewise, in an effort to reduce the data storage costs associated with their computing devices, some users may implement techniques designed to decrease the amount of storage space needed to store certain file data. For example, a user may implement a data-deduplication technique that enables a file system associated with the user's computing device to store unique instances of file data. In this example, the data-deduplication technique may involve identifying and eliminating redundant copies of the file data stored in the file system. By identifying and eliminating redundant copies of the file data, the data-deduplication technique may enable the file system to decrease the amount of storage space needed to store the file data.

Unfortunately, users may be unable to successfully implement conventional data-deduplication techniques in tiered file systems without compromising at least some of the performance benefits provided by the file system's tiered structure. For example, a conventional data-deduplication technique may consume computing resources needed to maximize the speed at which the "hot" data is accessed in the primary storage tier. As a result, the conventional data-deduplication technique may cause a 10-15% degradation in the primary storage tier's performance.

What is needed, therefore, is a mechanism that achieves the storage-saving benefits of data deduplication without compromising the performance benefits of tiered file systems.

SUMMARY

As will be described in greater detail below, the instant disclosure generally relates to systems and methods for deduplicating file data in tiered file systems. In one example, a computer-implemented method for deduplicating file data in tiered file systems may include (1) identifying a tiered file system that includes (a) a primary storage tier configured to store file data (e.g., a file or a sub-portion of a file) accessed within a predetermined period of time and (b) at least one deduplicated storage tier configured to store unique instances of file data that have not been accessed within the predetermined period of time, (2) detecting at least a portion of file data that has not been accessed in the primary storage tier within the predetermined period of time, (3) determining whether the portion of file data stored in the primary storage tier is also stored in the deduplicated storage tier, (4) ensuring that the deduplicated storage tier is currently storing a unique instance of the portion of file data stored in the primary storage tier in response to the determination, and then (5) removing the portion of file data from the primary storage tier since the portion of file data has not been accessed in the primary storage tier within the predetermined period of time.

In some examples, the method may also include identifying at least one database configured to store unique identifiers that identify the unique instances of file data stored in the deduplicated storage tier. In such examples, the method may further include generating at least one unique identifier that identifies the portion of file data that has not been accessed in the primary storage tier within the predetermined period of time. In addition, the method may include comparing the unique identifier that identifies the portion of file data with the unique identifiers stored in the database.

In some examples, the method may also include determining that the deduplicated storage tier is not currently storing the portion of file data based at least in part on the comparison of the unique identifier that identifies the portion of file data with the unique identifiers stored in the database. In such examples, the method may further include migrating a unique instance of the portion of file data from the primary storage tier to the deduplicated storage tier upon determining that the deduplicated storage tier is not currently storing the portion of file data. In addition, the method may include adding the unique identifier that identifies the portion of file data to the database.

In some examples, the method may also include detecting an attempt to access the portion of file data. In such examples, the method may further include migrating the unique instance of the portion of file data from the deduplicated storage tier to the primary storage tier in response to detecting the attempt to access the portion of file data. In addition, the method may include removing the unique identifier that identifies the portion of file data from the database.

In some examples, the method may also include determining that the portion of file data has been removed from the deduplicated storage tier. In such examples, the method may further include removing the unique identifier that identifies the portion of file data from the database in response to determining that the portion of file data has been removed from the deduplicated storage tier.

In some examples, the method may also include determining that the deduplicated storage tier is currently storing the portion of file data based at least in part on the comparison of the unique identifier that identifies the portion of file data with the unique identifiers stored in the database. In such examples, the method may further include directing a computing device to remove the portion of file data from the primary storage tier without migrating the portion of file data to the deduplicated storage tier upon determining that the deduplicated storage tier is currently storing the portion of file data.

In some examples, the method may also include facilitating direct access to the file data stored in the primary and deduplicated storage tiers without using a file system virtualization layer to virtualize the primary and deduplicated storage tiers.

In some examples, the tiered file system may include a short-term deduplicated storage tier configured to store unique instances of file data that have not been accessed within the predetermined period of time. In such examples, the tiered file system may also include a long-term deduplicated storage tier configured to store unique instances of file data that have not been accessed within an additional predetermined period of time that exceeds the predetermined period of time.

In some examples, the method may also include detecting at least one unique instance of file data that has not been accessed in the short-term deduplicated storage tier within the additional predetermined period of time. In such examples, the method may further include determining whether the unique instance of file data stored in the short-term deduplicated storage tier is also stored in the long-term deduplicated storage tier. In addition, the method may include ensuring that the long-term deduplicated storage tier is currently storing the unique instance of file data stored in the short-term deduplicated storage tier in response to the determination and then removing the unique instance of file data from the short-term deduplicated storage tier since the unique instance of file data has not been accessed in the short-term deduplicated storage tier within the additional predetermined period of time.

In some examples, the method may also include identifying a database configured to store unique identifiers that identify the unique instances of file data stored in the long-term deduplicated storage tier. In such examples, the method may further include identifying at least one unique identifier that identifies the unique instance of file data that has not been accessed in the short-term deduplicated storage tier within the additional predetermined period of time. In addition, the method may include comparing the unique identifier that identifies the unique instance of file data with the unique identifiers stored in the database.

In one embodiment, a system for implementing the above-described method may include (1) an identification module programmed to identify a tiered file system that includes (a) a primary storage tier configured to store file data accessed within a predetermined period of time and (b) at least one deduplicated storage tier configured to store unique instances of file data that have not been accessed within the predetermined period of time, (2) a detection module programmed to detect at least a portion of file data that has not been accessed in the primary storage tier within the predetermined period of time, (3) a deduplication module programmed to (a) determine whether the portion of file data stored in the primary storage tier is also stored in the deduplicated storage tier and (b) ensure that the deduplicated storage tier is currently storing a unique instance of the portion of file data stored in the primary storage tier in response to the determination, and (4) a removal module programmed to remove the portion of file data from the primary storage tier since the portion of file data has not been accessed in the primary storage tier within the predetermined period of time. The system may also include at least one processor configured to execute the identification module, the detection module, the deduplication module, and the removal module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a computing device, may cause the computing device to (1) identify a tiered file system that comprises (a) a primary storage tier configured to store file data accessed within a predetermined period of time and (b) at least one deduplicated storage tier configured to store unique instances of file data that have not been accessed within the predetermined period of time, (2) detect at least a portion of file data that has not been accessed in the primary storage tier within the predetermined period of time, (3) determine whether the portion of file data stored in the primary storage tier is also stored in the deduplicated storage tier, (4) ensure that the deduplicated storage tier is currently storing a unique instance of the portion of file data stored in the primary storage tier in response to the determination, and then (5) remove the portion of file data from the primary storage tier since the portion of file data has not been accessed in the primary storage tier within the predetermined period of time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for deduplicating file data in tiered file systems. As will be explained in greater detail below, by designating a primary storage tier of a file system to provide high-speed access to frequently accessed file data, the various systems and method described herein may achieve the performance benefits that derive from the file system's tiered structure.

By implementing data deduplication in one or more secondary storage tiers of the file system, the various systems and methods described herein may also achieve the storage-saving benefits of data deduplication without compromising the performance benefits provided by the primary storage tier of the file system. In addition, by providing the primary and deduplicated storage tiers within a single file system, the various systems and methods described herein may achieve these performance and storage-saving benefits without using a file system virtualization layer to virtualize the primary and deduplicated storage tiers.

Figure 1:
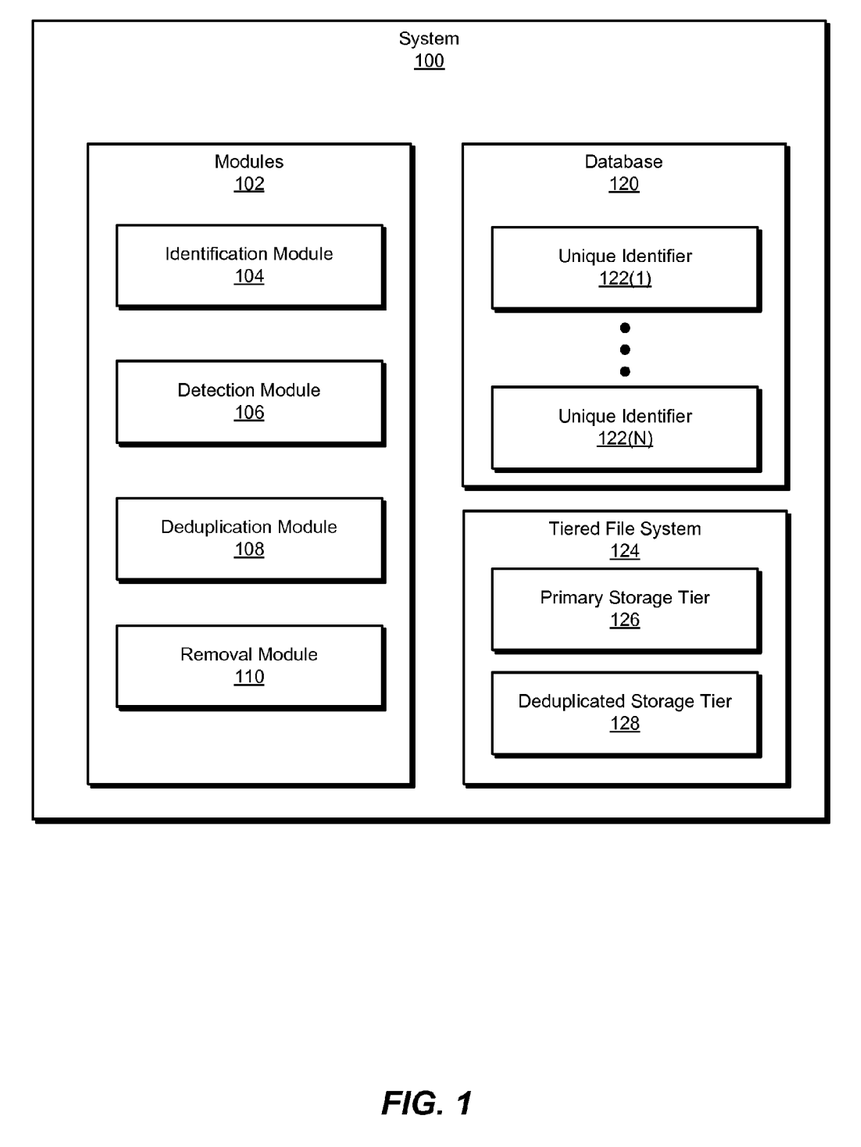
FIG. 1 is a block diagram of an exemplary system for deduplicating file data in tiered file systems.
Figure 2:
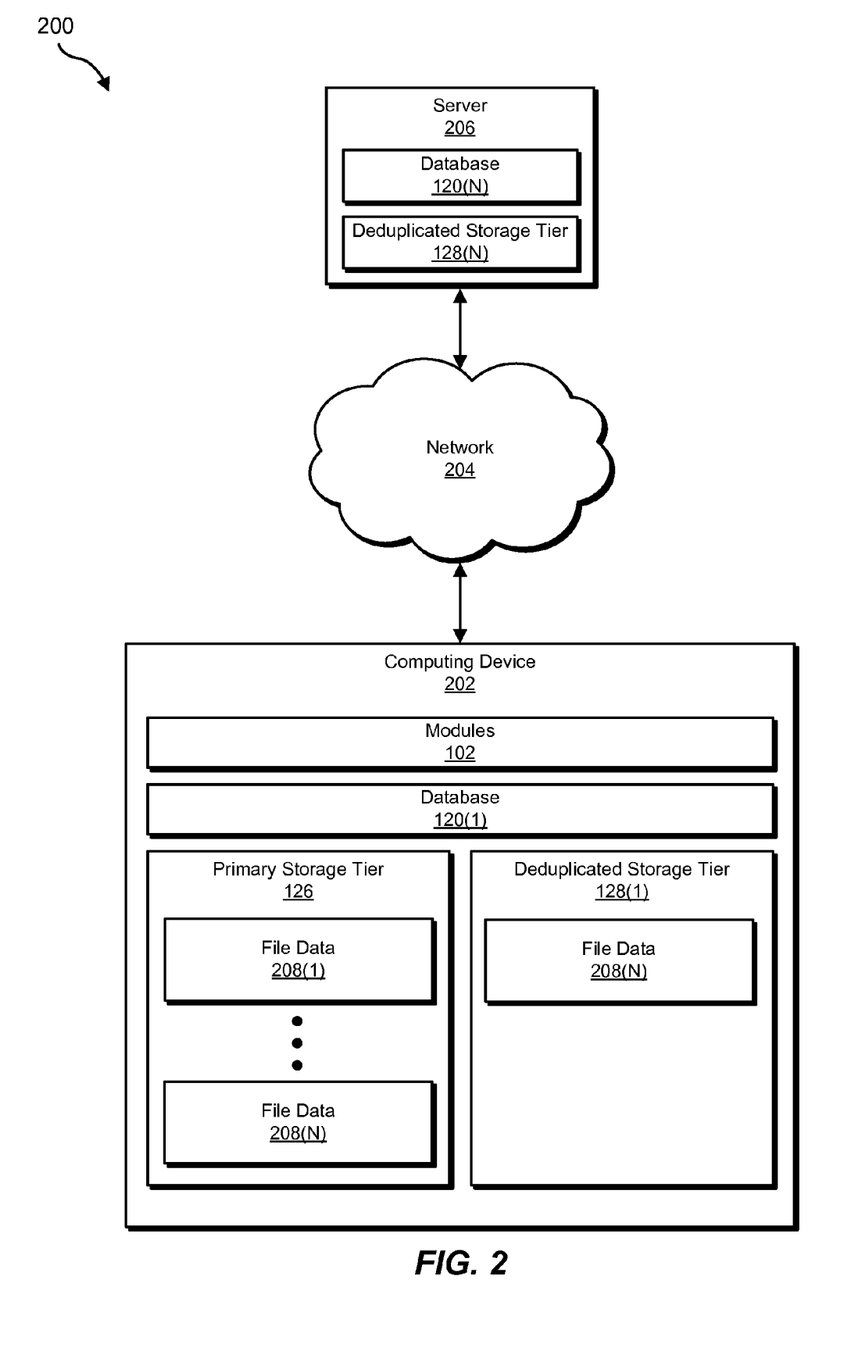
FIG. 2 is a block diagram of an exemplary system for deduplicating file data in tiered file systems.

The following will provide, with reference to FIGS. 1-2, detailed descriptions of exemplary systems for deduplicating file data in tiered file systems. Detailed descriptions of corresponding computer-implemented methods will be provided in connection with FIG. 3. Detailed descriptions of an exemplary unique identifier and exemplary file data will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for deduplicating file data in tiered file systems. As illustrated in this figure, exemplary system 100 may include one or more modules 102 for performing one or more tasks. For example, and as will be explained in greater detail below, exemplary system 100 may include an identification module 104 programmed to identify a tiered file system that includes (1) a primary storage tier configured to store file data accessed within a predetermined period of time and (2) at least one deduplicated storage tier configured to store unique instances of file data that have not been accessed within the predetermined period of time. Exemplary system 100 may also include a detection module 106 programmed to detect at least a portion of file data that has not been accessed in the primary storage tier within the predetermined period of time.

In addition, and as will be described in greater detail below, exemplary system 100 may include a deduplication module 108 programmed to (1) determine whether the portion of file data stored in the primary storage tier is also stored in the deduplicated storage tier and (2) ensure that the deduplicated storage tier is currently storing a unique instance of the portion of file data stored in the primary storage tier in response to the determination. Exemplary system 100 may further include a removal module 110 programmed to remove the portion of file data from the primary storage tier since the portion of file data has not been accessed in the primary storage tier within the predetermined period of time. Although illustrated as separate elements, one or more of modules 102 in FIG. 1 may represent portions of a single module or application (such as SYMANTEC'S VERITAS FILE SYSTEM or SYMANTEC'S CLUSTER FILE SYSTEM).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store unique identifiers 122(1)-(N) that identify unique instances of file data stored in the deduplicated storage tier of the tiered file system. Unique identifiers 122(1)-(N) generally represent any type or form of identifier capable of being used to identify, locate, and/or deduplicate file data stored in a tiered file system. Examples of unique identifiers 122(1)-(N) include, without limitation, hashes, fingerprints, checksums, MD5 checksums, secure hash algorithms, digital signatures, references, pointers, or any other suitable identifiers.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

As illustrated in FIG. 1, exemplary system 100 may further include a tiered file system, such as tiered file system 124. In one example, tiered file system 124 may include a primary storage tier 126 configured to store frequently accessed file data and at least one deduplicated storage tier 128 configured to store unique instances of file data that have not been accessed within a predetermined period of time. In this example, primary storage tier 126 and deduplicated storage tier 128 may represent different partitions delineated by one or more characteristics (such as one or more performance- and/or function-related characteristics) in a single file system.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the file data in database 120(1). Additionally or alternatively, server 206 may be programmed with one or more of modules 102 and/or may store all or a portion of the file data in database 120(N).

As shown in FIG. 2, computing device 202 may include primary storage tier 126 and deduplicated storage tier 128(1) of tiered file system 124. Primary storage tier 126 may be configured to store frequently and/or recently accessed file data. For example, primary storage tier 126 may store file data 208(1)-(N) representing portions of one or more files that have been accessed within a period of time designated by a user of computing device 202. In this example, primary storage tier 126 may also store additional file data not illustrated in FIG. 2.

Deduplicated storage tier 128(1) may be configured to store unique instances of file data that have not been accessed within a predetermined period of time. For example, deduplicated storage tier 128(1) may store file data 208(N) representing a portion of a file that has not been accessed within a period of time designated by the user of computing device 202. In this example, deduplicated storage tier 128(1) may also store additional file data not illustrated in FIG. 2.

In addition, file data 208(N) stored in deduplicated storage tier 128(1) may represent data that is effectively identical to file data 208(N) stored in primary storage tier 126. However, file data 208(N) stored in deduplicated storage tier 128(1) may have originated from a different file than file data 208(N) stored in primary storage tier 126.

As shown in FIG. 2, server 206 may include deduplicated storage tier 128(N) of tiered file system 124. Deduplicated storage tier 128(N) may be configured to store unique instances of file data that have not been accessed within a predetermined period of time. For example, deduplicated storage tier 128(N) may store file data representing portions of one or more files that have not been accessed within a specific period of time designated by the user of computing device 202. In this example, deduplicated storage tier 128(N) may also store additional file data not illustrated in FIG. 2.

As will be described in greater detail below, deduplicated storage tier 128(N) may be configured to store unique instances of file data that have not been accessed within a period of time that exceeds the period of time associated with deduplicated storage tier 128(1). In other words, while deduplicated storage tier 128(1) may represent a relatively short-term deduplicated storage tier, deduplicated storage tier 128(N) may represent a relatively long-term deduplicated storage tier.

In one embodiment, one or more of modules 102 from FIG. 1 may, when executed by at least one processor of computing device 202 and/or server 206, facilitate computing device 202 and/or server 206 in deduplicating file data in tiered file systems. For example, and as will be described in greater detail below, one or more of modules 102 may cause computing device 202 and/or server 206 to (1) identify tiered file system 124 as including (a) primary storage tier 126 configured to store file data accessed within a predetermined period of time and (b) deduplicated storage tiers 128(1)-(N) configured to store unique instances of file data that have not been accessed within the predetermined period of time, (2) detect at least a portion of file data that has not been accessed in primary storage tier 126 within the predetermined period of time, (3) determine whether the portion of file data stored in primary storage tier 126 is also stored in deduplicated storage tier 128(1), (4) ensure that deduplicated storage tier 128(1) is currently storing a unique instance of the portion of file data stored in primary storage tier 126 in response to the determination, and then (5) remove the portion of file data from primary storage tier 126 since the portion of file data has not been accessed in primary storage tier 126 within the predetermined period of time.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device capable of providing and/or facilitating access to unique instances of file data stored in at least one deduplicated storage tier of a tiered file system. Examples of server 206 include, without limitation, application servers, web servers, storage servers, and database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
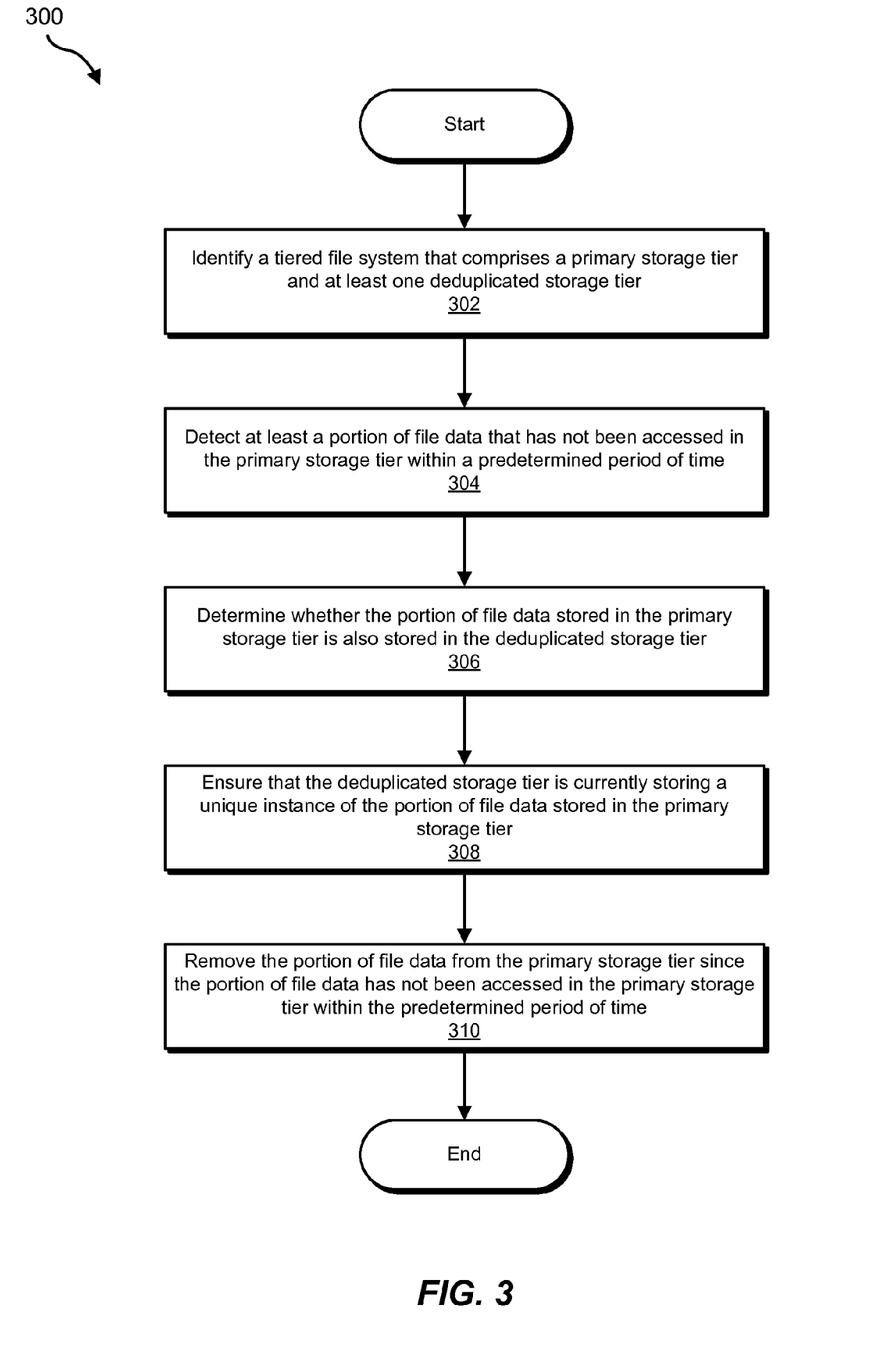
FIG. 3 is a flow diagram of an exemplary method for deduplicating file data in tiered file systems.

FIG. 3 is a flow diagram of an exemplary computer-implemented method 300 for deduplicating file data in tiered file systems. The steps shown in FIG. 3 may be performed by any suitable computer-executable code and/or computing system.

Figure 5:
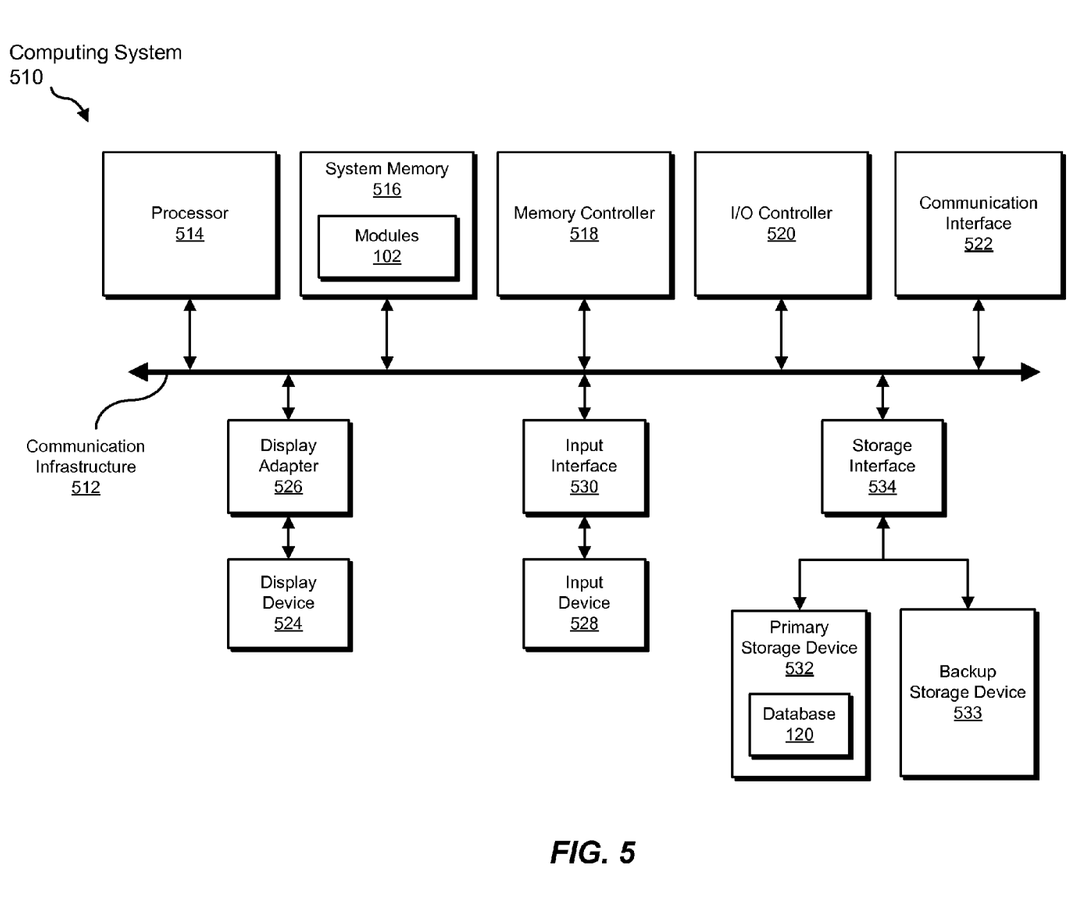
FIG. 5 is a block diagram of an exemplary computing system capable of implementing one or more of the embodiments described and/or illustrated herein.
Figure 6:
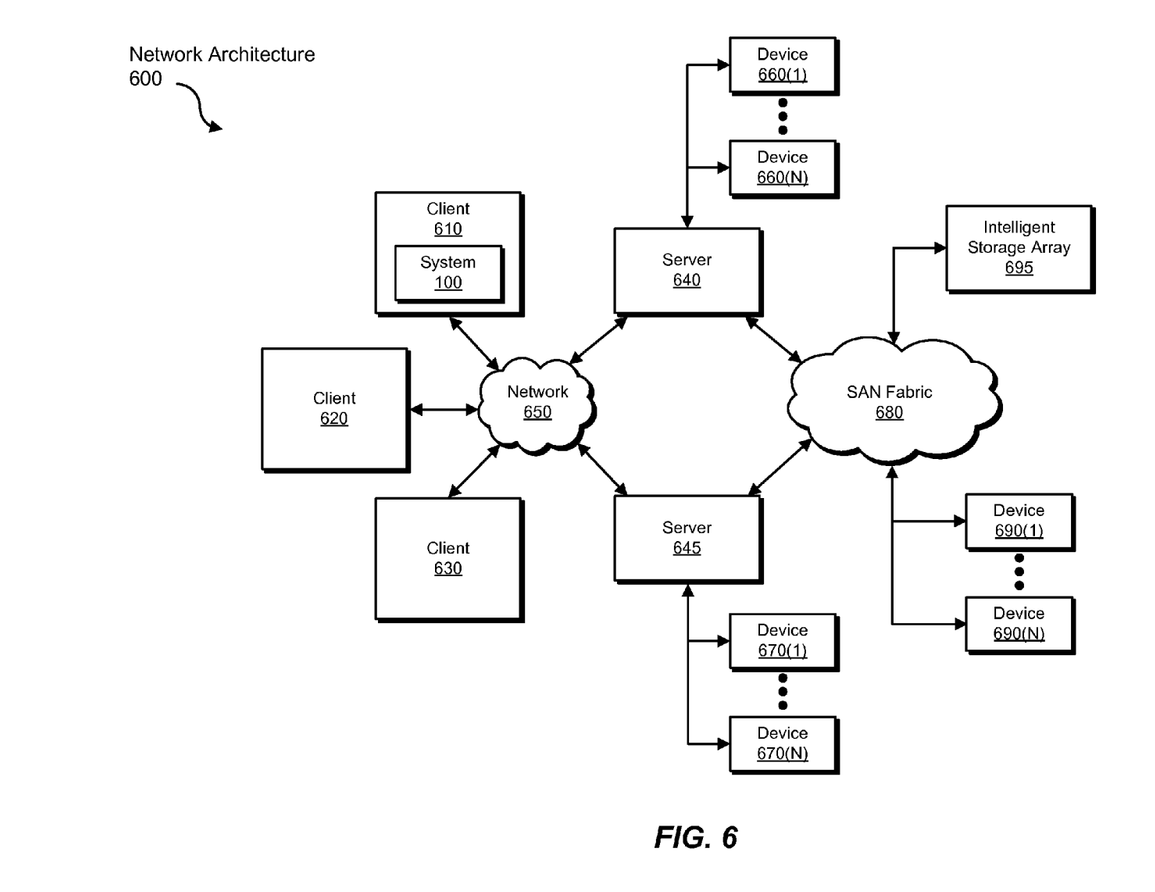
FIG. 6 is a block diagram of an exemplary computing network capable of implementing one or more of the embodiments described and/or illustrated herein.

In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated at step 302 in FIG. 3, one or more of the various systems described herein may identify a tiered file system that includes a primary storage tier configured to store file data accessed within a predetermined period of time and at least one deduplicated storage tier configured to store unique instances of file data that have not been accessed within the predetermined period of time. For example, identification module 104 may, as part of computing device 202, identify tiered file system 124 as including primary storage tier 126 and deduplicated storage tiers 128(1)-(N).

In one example, primary storage tier 126 may be configured to store any file data that has been accessed in tiered file system 124 within the last week. In this example, deduplicated storage tier 128(1) may be configured to store any file data that has been accessed in tiered file system 124 within the last month but not within the last week. In addition, deduplicated storage tier 128(N) may be configured to store any file data that has not been accessed in tiered file system 124 within the last month.

The systems described herein may perform step 302 in a variety of ways. In some examples, identification module 104 may identify primary storage tier 126 and deduplicated storage tiers 128(1)-(N) as computing device 202 begins to implement tiered file system 124. For example, a user of computing device 202 may direct computing device 202 to create tiered file system 124 as part of a software installation process. In this example, identification module 104 may identify primary storage tier 126 and deduplicated storage tiers 128(1)-(N) at the time the user directs computing device 202 to perform the software installation process.

In another example, the user of computing device 202 may direct computing device 202 to implement a storage-tiering paradigm that applies primary storage tier 126 and deduplicated storage tiers 128(1)-(N) to tiered file system 124. In this example, identification module 104 may identify primary storage tier 126 and deduplicated storage tiers 128(1)-(N) at the time the user directs computing device 202 to implement the storage-tiering paradigm in tiered file system 124.

In an additional example, identification module 104 may be configured to monitor tiered file system 124 on computing device 202. In this example, while monitoring tiered file system 124, identification module 104 may detect a process that effectively partitions tiered file system 124 into primary storage tier 126 and deduplicated storage tiers 128(1)-(N). This partitioning process may enable tiered file system 124 to provide performance benefits via primary storage tier 126 as well as storage-saving benefits via deduplication storage tiers 128(1)-(N).

Since primary storage tier 126 and deduplicated storage tiers 128(1)-(N) represent distinct tiers of a single file system, computing device 202 may access the file data stored in primary storage tier 126 and deduplicated storage tiers 128(1)-(N) without requiring a file system virtualization layer to disguise distinct file systems as a single file system. In other words, tiered file system 124 may facilitate direct access to the file data stored in primary storage tier 126 and deduplicated storage tiers 128(1)-(N) without using a file system virtualization layer to virtualize the primary storage tier 126 and deduplicated storage tiers 128(1)-(N).

As illustrated at step 304 in FIG. 3, one or more of the various systems described herein may detect at least a portion of file data that has not been accessed in the primary storage tier within the predetermined period of time. For example, detection module 106 may, as part of computing device 202, detect file data 208(1) as not having been accessed in primary storage tier 126 within the last week. In one example, file data 208(1) may represent an entire file stored in primary storage tier 126. In another example, file data 208(1) may represent a sub-portion of a file (e.g., less than an entire file) stored in primary storage tier 126.

The systems described herein may perform step 304 in a variety of ways. In some examples, detection module 106 may be configured to perform periodic scans of primary storage tier 126. For example, detection module 106 may perform a daily scan of primary storage tier 126 to determine whether any of file data 208(1)-(N) has not been accessed within the last week. In this example, while performing the daily scan of primary storage tier 126, detection module 106 may determine that file data 208(1) has not been accessed within the last week.

In some examples, detection module 106 may be configured to perform a scan of primary storage tier 126 in response to user input. For example, the user of computing device 202 may enter user input that directs detection module 106 to scan primary storage tier 126 to determine whether any of file data 208(1)-(N) has not been accessed within the last week. In this example, while performing the scan of primary storage tier 126 in response to the user input, detection module 106 may determine that file data 208(1) has not been accessed within the last week.

In some examples, detection module 106 may be configured to monitor the file data stored in primary storage tier 126. For example, detection module 106 may monitor file data 208(1)-(N) to identify any of file data 208(1)-(N) that no longer qualifies to be stored in primary storage tier 126. In this example, while monitoring file data 208(1)-(N) stored in primary storage tier 126, detection module 106 may determine that file data 208(1) no longer qualifies to be stored in primary storage tier 126 since file data 208(1) has not been accessed within the last week.

Additionally or alternatively, detection module 106 may detect file data 208(N) as not having been accessed in primary storage tier 126 within the last week. In one example, file data 208(N) may represent an entire file stored in primary storage tier 126. In another example, file data 208(N) may represent a sub-portion of a file (e.g., less than an entire file) stored in primary storage tier 126.

As illustrated at step 306 in FIG. 3, one or more of the various systems described herein may determine whether the portion of file data stored in the primary storage tier is also stored in the deduplicated storage tier. For example, deduplication module 108 may, as part of computing device 202, determine whether file data 208(1) is also stored in deduplicated storage tier 128(1). In this example, deduplication module 108 may initiate the determination process in response to the detection of file data 208(1) not having been accessed in primary storage tier 126 within the last week.

The systems described herein may perform step 306 in a variety of ways. In some examples, deduplication module 108 may generate at least one unique identifier (such as a hash, fingerprint, or checksum) that identifies file data 208(1). In one example, deduplication module 108 may analyze primary storage tier 126 to determine the memory locations of file data 208(1). For example, as illustrated in FIG. 4, file data 208(1) may include data located at memory locations identified by particular physical addresses (in this example, "0x10940AF2" through "0x109421DB") associated with primary storage tier 126.

Figure 4:
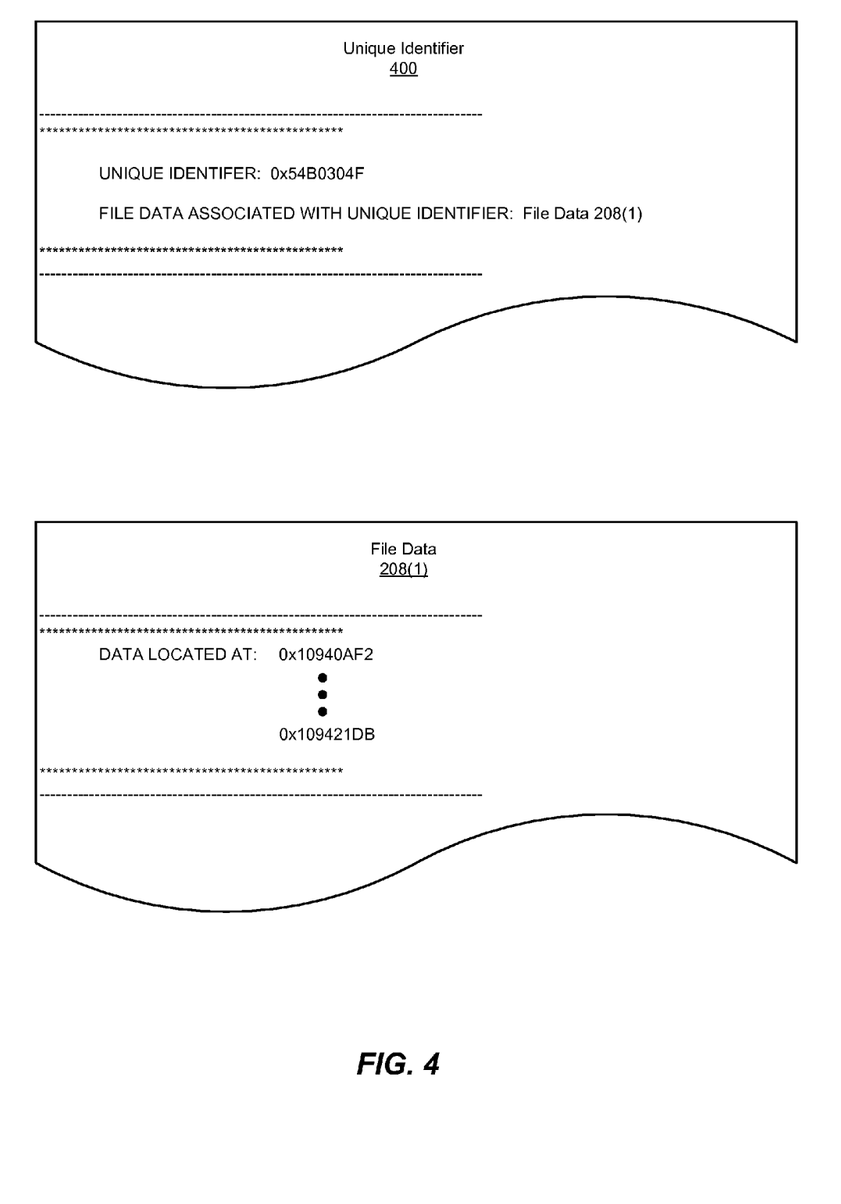
FIG. 4 is an illustration of an exemplary unique identifier and exemplary file data.

In one example, upon locating the data stored at the memory locations, deduplication module 108 may use a fingerprinting algorithm to generate a unique identifier 400 in FIG. 4 that identifies the data. For example, as illustrated in FIG. 4, unique identifier 400 (in this example, "0x54B0304F") may identify file data 208(1) between physical addresses "0x10940AF2" and "0x109421DB" associated with primary storage tier 126. In this example, deduplication module 108 may then compare unique identifier "0x54B0304F" with unique identifiers 122(1)-(N) stored in database 120(1) to determine whether file data 208(1) is already stored in deduplicated storage tier 128(1).

In one example, deduplication module 108 may determine that deduplicated storage tier 128(1) is not currently storing file data 208(1) based at least in part on the comparison of unique identifier 400 with unique identifiers 122(1)-(N) stored in database 120(1). For example, deduplication module 108 may search database 120(1) for unique identifier "0x54B0304F." In this example, upon completing the search of database 120(1), deduplication module 108 may determine that none of unique identifiers 122(1)-(N) stored in database 120(1) match unique identifier "0x54B0304F." Since none of unique identifiers 122(1)-(N) stored in database 120(1) match unique identifier "0x54B0304F," deduplication module 108 may determine that file data 208(1) is not currently stored in deduplicated storage tier 128(1).

Additionally or alternatively, deduplication module 108 may determine that deduplicated storage tier 128(1) is currently storing file data 208(N) based at least in part on a comparison of a unique identifier that identifies file data 208(N) with unique identifiers 122(1)-(N) stored in database 120(1). For example, deduplication module 108 may search database 120(1) for a unique identifier that identifies file data 208(N). In this example, upon completing the search of database 120(1), deduplication module 108 may determine that unique identifier 122(1) stored in database 120(1) matches the unique identifier that identifies file data 208(N). Since unique identifier 122(1) stored in database 120(1) matches the unique identifier that identifies file data 208(N), deduplication module 108 may determine that file data 208(N) is already stored in deduplicated storage tier 128(1).

As illustrated at step 308 in FIG. 3, one or more of the various systems described herein may ensure that the deduplicated storage tier is currently storing a unique instance of the portion of file data stored in the primary storage tier. For example, deduplication module 108 may, as part of computing device 202, ensure that deduplicated storage tier 128(1) is currently storing a unique instance of file data 208(1). In this example, deduplication module 108 may initiate the ensuring process in response to the determination of whether file data 208(1) is also stored in deduplicated storage tier 128(1).

The systems described herein may perform step 308 in a variety of ways. In some examples, upon determining that deduplicated storage tier 128(1) is not currently storing file data 208(1), deduplication module 108 may migrate a unique instance of file data 208(1) from primary storage tier 126 to deduplicated storage tier 128(1). For example, deduplication module 108 may copy file data 208(1) from physical addresses "0x10940AF2" through "0x109421DB" associated with primary storage tier 126 to deduplicated storage tier 128(1). In this example, the copy of file data 208(1) may represent a unique instance of the data stored in deduplicated storage tier 128(1).

In some examples, upon migrating the unique instance of file data 208(1) from primary storage tier 126 to deduplicated storage tier 128(1), deduplication module 108 may add unique identifier 400 to database 120(1). For example, deduplication module 108 may add unique identifier "0x54B0304F" to database 120(1) to indicate that file data 208(1) is now stored in deduplicated storage tier 128(1). By adding unique identifier "0x54B0304F" to database 120(1), deduplication module 108 may ensure that a duplicate instance of file data 208(1) is not unnecessarily migrated from primary storage tier 126 to deduplicated storage tier 128(1) at a later time.

Additionally or alternatively, upon determining that deduplicated storage tier 128(1) is currently storing file data 208(N), deduplication module 108 may direct computing device 202 (or removal module 110) to simply remove file data 208(N) from primary storage tier 126 without migrating file data 208(N) to deduplicated storage tier 128(1). By directing computing device 202 (or removal module 110) to simply remove file data 208(N) from primary storage tier 126, deduplication module 108 may ensure that a duplicate instance of file data 208(N) is not unnecessarily migrated from primary storage tier 126 to deduplicated storage tier 128(1).

As illustrated at step 310 in FIG. 3, one or more of the various systems described herein may remove the portion of file data from the primary storage tier since the portion of file data has not been accessed in the primary storage tier within the predetermined period of time. For example, removal module 110 may, as part of computing device 202, remove file data 208(1) from primary storage tier 126. In this example, removal module 110 may initiate the removal process since file data 208(1) has not been accessed in primary storage tier 126 within the last week.

The systems described herein may perform step 310 in a variety of ways. In one example, after the unique instance of file data 208(1) has been copied from primary storage tier 126 to deduplicated storage tier 128(1), removal module 110 may delete file data 208(1) from primary storage tier 126. For example, removal module 110 may delete file data 208(1) from physical addresses "0x10940AF2" through "0x109421DB" associated with primary storage tier 126. In this example, computing device 202 may still access file data 208(1) via deduplicated storage tier 128(1) even after the deletion of file data 208(1) from primary storage tier 126.

Additionally or alternatively, removal module 110 may delete file data 208(N) from primary storage tier 126 since file data 208(N) is already stored in deduplicated storage tier 128(1). Computing device 202 may still access file data 208(N) via deduplicated storage tier 128(1) even after the deletion of file data 208(N) from primary storage tier 126. Upon completion of step 310 in FIG. 3, exemplary method 300 may terminate.

In some embodiments, exemplary method 300 may also include one or more additional steps not illustrated in FIG. 3. In one example, after the unique instance of file data 208(1) has been copied from primary storage tier 126 to deduplicated storage tier 128(1), deduplication module 108 may detect an attempt to access file data 208(1). For example, the user of computing device 202 may attempt to open a file that includes file data 208(1). In response to detecting the user's attempt to open the file that includes file data 208(1), deduplication module 108 may migrate the unique instance of file data 208(1) from deduplicated storage tier 128(1) back to primary storage tier 126. In addition, deduplication module 108 may then remove unique identifier 400 that identifies file data 208(1) from database 120(1) since file data 208(1) is no longer stored in deduplicated storage tier 128(1).

In one example, detection module 106 may detect the unique instance of file data 208(N) as not having been accessed in deduplicated storage tier 128(1) within the last month. In response to this detection, deduplication module 108 may determine whether the unique instance of file data 208(N) stored in deduplicated storage tier 128(1) is also stored in deduplicated storage tier 128(N). For example, deduplication module 108 may locate unique identifier 122(1) that identifies file data 208(N) in database 120(1).

In one example, upon locating unique identifier 122(1) in database 120(1), deduplication module 108 may compare unique identifier 122(1) with unique identifiers stored in database 120(N). In this example, the unique identifiers stored in database 120(N) may identify unique instances of file data stored in deduplicated storage tier 128(N). Deduplication module 108 may determine whether file data 208(N) is already stored in deduplicated storage tier 128(N) based at least in part on the comparison of unique identifier 122(1) with the unique identifiers stored in database 120(N).

In response to the determination of whether file data 208(N) is already stored in deduplicated storage tier 128(N), deduplication module 108 may ensure that deduplicated storage tier 128(N) is currently storing a unique instance of file data 208(N). Removal module 110 may then remove the unique instance of file data 208(N) from deduplicated storage tier 128(1) since the unique instance of file data 208(N) has not been accessed in deduplicated storage tier 128(1) within the last month.

In another example, deduplication module 108 may determine that deduplicated storage tier 128(N) is currently storing file data 208(N) based at least in part on the comparison of unique identifier 122(1) with the unique identifiers stored in database 120(N). In this example, upon determining that deduplicated storage tier 128(N) is currently storing file data 208(N), deduplication module 108 may direct computing device 202 (or removal module 110) to simply remove file data 208(N) from deduplicated storage tier 128(1) without migrating file data 208(N) to deduplicated storage tier 128(N). Removal module 110 may then remove the unique instance of file data 208(N) from deduplicated storage tier 128(1) since the unique instance of file data 208(N) has not been accessed in deduplicated storage tier 128(1) within the last month.

In one example, removal module 110 may be configured to perform periodic scans of one or more of deduplicated storage tiers 128(1)-(N). For example, removal module 110 may perform a daily scan of deduplicated storage tier 128(1) to determine whether any unique instances of file data have recently been removed from deduplicated storage tier 128(1). In this example, while performing the daily scan of deduplicated storage tier 128(1), removal module 110 may determine that the unique instance of file data 208(N) has been removed from deduplicated storage tier 128(1). In response to this determination, removal module 110 may remove unique identifier 122(1) that identifies file data 208(N) from database 120(1).

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, detecting, determining, ensuring, removing, generating, comparing, migrating, adding, directing, and facilitating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, detecting, determining, ensuring, removing, generating, comparing, migrating, adding, directing, and facilitating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for deduplicating file data in tiered file systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (e.g., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may detect file data that has not been accessed in a primary storage tier of a tiered file system within a predetermined period of time, transform the file data by migrating a unique instance of the data to a deduplicated storage tier of the tiered file system, generate a unique identifier that identifies the unique instance of file data, use the unique identifier to ensure that a duplicate instance of the file data is not unnecessarily migrated to the deduplicated storage tier, and add the unique identifier to a database that stores unique identifiers that identify the unique instances of file data stored in the deduplicated storage tier. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for deduplicating file data in tiered file systems, at least a portion of the method being performed by a computing device comprising at least one processor, the method comprising:
enabling a user of the computing device to implement a storage-tiering paradigm that partitions a single tiered file system into:
a primary storage tier configured to store file data accessed within a predetermined period of time without data deduplication;
a short-term deduplicated storage tier configured to store unique instances of file data that have not been accessed within the predetermined period of time;
a long-term deduplicated storage tier configured to store unique instances of file data that have not been accessed within an additional predetermined period of time that exceeds the predetermined period of time;
detecting at least a portion of file data that has not been accessed in the primary storage tier within the predetermined period of time;

in response to detecting the portion of file data that has not been accessed in the primary storage tier within the predetermined period of time, determining whether the portion of file data stored in the primary storage tier is also stored in the short-term deduplicated storage tier;

in response to determining whether the portion of file data stored in the primary storage tier is also stored in the short-term deduplicated storage tier:
  ensuring that the short-term deduplicated storage tier is currently storing a unique instance of the portion of file data stored in the primary storage tier;
  removing the portion of file data from the primary storage tier since the portion of file data has not been accessed in the primary storage tier within the predetermined period of time;

detecting at least one unique instance of file data that has not been accessed in the short-term deduplicated storage tier within the additional predetermined period of time;

in response to detecting the unique instance of file data that has not been accessed in the short-term deduplicated storage tier within the additional predetermined period of time, determining whether the unique instance of file data stored in the short-term deduplicated storage tier is also stored in the long-term deduplicated storage tier;

in response to determining whether the unique instance of file data stored in the short-term deduplicated storage tier is also stored in the long-term deduplicated storage tier:
  ensuring that the long-term deduplicated storage tier is currently storing the unique instance of file data stored in the short-term deduplicated storage tier;
  removing the unique instance of file data from the short-term deduplicated storage tier since the unique instance of file data has not been accessed in the short-term deduplicated storage tier within the additional predetermined period of time;

detecting an attempt by the user to open a file that includes the file data;

in response to detecting the attempt by the user to open the file that includes the file data, migrating the unique instance of file data from the long-term deduplicated storage tier back to the primary storage tier such that the file data is no longer deduplicated;

facilitating direct access to the file data stored in the primary, short-term deduplicated, and long-term deduplicated storage tiers without using a file system virtualization layer to virtualize the primary, short-term deduplicated, and long-term deduplicated storage tiers due at least in part to the primary, short-term deduplicated, and long-term deduplicated storage tiers all being included in the single tiered file system.

2. The method of claim 1, wherein determining whether the portion of file data stored in the primary storage tier is also stored in the short-term deduplicated storage tier comprises:
  identifying at least one database configured to store unique identifiers that identify the unique instances of file data stored in the short-term deduplicated storage tier;
  generating at least one unique identifier that identifies the portion of file data that has not been accessed in the primary storage tier within the predetermined period of time;
  comparing the unique identifier that identifies the portion of file data with the unique identifiers stored in the database.

3. The method of claim 2, wherein determining whether the portion of file data stored in the primary storage tier is also stored in the short-term deduplicated storage tier comprises at least one of:
  determining, based at least in part on the comparison, that the short-term deduplicated storage tier is not currently storing the portion of file data;
  determining, based at least in part on the comparison, that the short-term deduplicated storage tier is currently storing the portion of file data.

4. The method of claim 3, wherein ensuring that the short-term deduplicated storage tier is currently storing the unique instance of the portion of file data comprises:
  upon determining that the short-term deduplicated storage tier is not currently storing the portion of file data:
  migrating a unique instance of the portion of file data from the primary storage tier to the short-term deduplicated storage tier;
  adding the unique identifier that identifies the portion of file data to the database.

5. The method of claim 4, further comprising:
  detecting an attempt to access the portion of file data;
  in response to detecting the attempt to access the portion of file data:
    migrating the unique instance of the portion of file data from the short-term deduplicated storage tier to the primary storage tier;
    removing the unique identifier that identifies the portion of file data from the database.

6. The method of claim 4, further comprising:
  determining that the portion of file data has been removed from the short-term deduplicated storage tier;
  in response to determining that the portion of file data has been removed from the short-term deduplicated storage tier, removing the unique identifier that identifies the portion of file data from the database.

7. The method of claim 3, wherein ensuring that the short-term deduplicated storage tier is currently storing the unique instance of the portion of file data comprises:
  upon determining that the short-term deduplicated storage tier is currently storing the portion of file data, directing the computing device to remove the portion of file data from the primary storage tier without migrating the portion of file data to the short-term deduplicated storage tier.

8. The method of claim 1, wherein the portion of file data comprises a sub-portion of a file stored in the primary storage tier.

9. The method of claim 1, wherein determining whether the unique instance of file data stored in the short-term deduplicated storage tier is also stored in the long-term deduplicated storage tier comprises:
  identifying a database configured to store unique identifiers that identify the unique instances of file data stored in the long-term deduplicated storage tier;
  identifying at least one unique identifier that identifies the unique instance of file data that has not been accessed in the short-term deduplicated storage tier within the additional predetermined period of time;
  comparing the unique identifier that identifies the unique instance of file data with the unique identifiers stored in the database.

10. The method of claim 1, wherein:
  the primary storage tier is included on a computing system;
  the short-term deduplicated storage tier is included on the computing system.

11. The method of claim 10, wherein the long-term deduplicated storage tier is included on a server.

12. A system for deduplicating file data in tiered file systems, the system comprising:
an identification module, stored in memory, that identifies a storage-tiering paradigm implemented by a user of a computing device that partitions a single tiered file system into:
  a primary storage tier configured to store file data accessed within a predetermined period of time without data deduplication;
  a short-term deduplicated storage tier configured to store unique instances of file data that have not been accessed within the predetermined period of time;
  a long-term deduplicated storage tier configured to store unique instances of file data that have not been accessed within an additional predetermined period of time that exceeds the predetermined period of time;
a detection module, stored in memory, that:
  detects at least a portion of file data that has not been accessed in the primary storage tier within the predetermined period of time;
  detects at least one unique instance of file data that has not been accessed in the short-term deduplicated storage tier within the additional predetermined period of time;
  detects an attempt by the user to open a file that includes another unique instance of file data stored in the long-term deduplicated storage tier;
a deduplication module, stored in memory, that:
  determines, in response to the detection of the portion of file data stored in the primary storage tier, whether the portion of file data stored in the primary storage tier is also stored in the short-term deduplicated storage tier;
  ensures, in response to the determination of whether the portion of file data stored in the primary storage tier is also stored in the short-term deduplicated storage tier, that the short-term deduplicated storage tier is currently storing a unique instance of the portion of file data stored in the primary storage tier;
  determines, in response to the detection of the unique instance of file data stored in the short-term deduplicated storage tier, whether the unique instance of file data stored in the short-term deduplicated storage tier is also stored in the long-term deduplicated storage tier;
  ensures, in response to the determination of whether the unique instance of file data stored in the short-term deduplicated storage tier is also stored in the long-term deduplicated storage tier, that the long-term deduplicated storage tier is currently storing the unique instance of file data stored in the short-term deduplicated storage tier;
  migrates, in response to the detection of the attempt by the user to open the file that includes the other unique instance of file data, the other unique instance of file data from the long-term deduplicated storage tier to the primary storage tier such that the other unique instance of file data is no longer deduplicated;
a removal module, stored in memory, that:
  removes the portion of file data from the primary storage tier since the portion of file data has not been accessed in the primary storage tier within the predetermined period of time;
  removes the unique instance of file data from the short-term deduplicated storage tier since the unique instance of file data has not been accessed in the short-term deduplicated storage tier within the additional predetermined period of time;
wherein the single tiered file system facilitates direct access to the file data stored in the primary, short-term deduplicated, and long-term deduplicated storage tiers without using a file system virtualization layer to virtualize the primary, short-term deduplicated, and long-term deduplicated storage tiers due at least in part to the primary, short-term deduplicated, and long-term deduplicated storage tiers all being included in the single tiered file system;
at least one processor that executes the identification module, the detection module, the deduplication module, and the removal module.

13. The system of claim 12, wherein the deduplication module:
identifies at least one database configured to store unique identifiers that identify the unique instances of file data stored in the short-term deduplicated storage tier;
generates at least one unique identifier that identifies the portion of file data that has not been accessed in the primary storage tier within the predetermined period of time;
compares the unique identifier that identifies the portion of file data with the unique identifiers stored in the database.

14. The system of claim 13, wherein the deduplication module:
determines, based at least in part on the comparison, that the short-term deduplicated storage tier is not currently storing the portion of file data;
in response to the determination that the short-term deduplicated storage tier is not currently storing the portion of file data:
  migrates a unique instance of the portion of file data from the primary storage tier to the short-term deduplicated storage tier;
  adds the unique identifier that identifies the portion of file data to the database.

15. The system of claim 14, wherein the deduplication module:
detects an attempt to access the portion of file data;
migrates the unique instance of the portion of file data from the short-term deduplicated storage tier to the primary storage tier in response to the detection of the attempt to access the portion of file data;
removes the unique identifier that identifies the portion of file data from the database.

16. The system of claim 14, wherein the removal module that:
determines that the portion of file data has been removed from the short-term deduplicated storage tier;
removes the unique identifier that identifies the portion of file data from the database in response to the determination that the portion of file data has been removed from the short-term deduplicated storage tier.

17. The system of claim 13, wherein the deduplication module:
determines, based at least in part on the comparison, that the short-term deduplicated storage tier is currently storing the portion of file data;
directs the removal module to remove the portion of file data from the primary storage tier without migrating the portion of file data to the short-term deduplicated storage tier since the portion of file data is already stored in the short-term deduplicated storage tier.

18. The system of claim 12, wherein the portion of file data comprises a sub-portion of a file stored in the primary storage tier.

19. The system of claim 12, wherein:
the primary storage tier is included on a computing system;
the short-term deduplicated storage tier is included on the computing system;
the long-term deduplicated storage tier is included on a server.

20. A non-transitory computer-readable-storage medium comprising one or more computer-executable instructions that, when executed by at least one processor of a computing device, cause the computing device to:
enable a user of the computing device to implement a storage-tiering paradigm that partitions a single tiered file system into:
  a primary storage tier configured to store file data accessed within a predetermined period of time without data deduplication;
  a short-term deduplicated storage tier configured to store unique instances of file data that have not been accessed within the predetermined period of time;
  a long-term deduplicated storage tier configured to store unique instances of file data that have not been accessed within an additional predetermined period of time that exceeds the predetermined period of time;
detect at least a portion of file data that has not been accessed in the primary storage tier within the predetermined period of time;
determine, in response to the detection of the portion of file data stored in the primary storage tier, whether the portion of file data stored in the primary storage tier is also stored in the short-term deduplicated storage tier;
ensure, in response to the determination of whether the portion of file data stored in the primary storage tier is also stored in the short-term deduplicated storage tier, that the short-term deduplicated storage tier is currently storing a unique instance of the portion of file data stored in the primary storage tier;
remove the portion of file data from the primary storage tier since the portion of file data has not been accessed in the primary storage tier within the predetermined period of time;
detect at least one unique instance of file data that has not been accessed in the short-term deduplicated storage tier within the additional predetermined period of time;
determine, in response to the detection of the unique instance of file data stored in the short-term deduplicated storage tier, whether the unique instance of file data stored in the short-term deduplicated storage tier is also stored in the long-term deduplicated storage tier;
ensure, in response to the determination of whether the unique instance of file data stored in the short-term deduplicated storage tier is also stored in the long-term deduplicated storage tier, that the long-term deduplicated storage tier is currently storing the unique instance of file data stored in the short-term deduplicated storage tier;
remove the unique instance of file data from the short-term deduplicated storage tier since the unique instance of file data has not been accessed in the short-term deduplicated storage tier within the additional predetermined period of time;
detect an attempt by the user to open a file that includes the file data;
migrate, in response to the detection of the attempt by the user to open the file that includes the file data, the unique instance of file data from the long-term deduplicated storage tier back to the primary storage tier such that the file data is no longer deduplicated;
facilitate direct access to the file data stored in the primary, short-term deduplicated, and long-term deduplicated storage tiers without using a file system virtualization layer to virtualize the primary, short-term deduplicated, and long-term deduplicated storage tiers due at least in part to the primary, short-term deduplicated, and long-term deduplicated storage tiers all being included in the single tiered file system.

\* \* \* \* \*